(12) United States Patent  
Youn et al.

(10) Patent No.: US 11,397,138 B2  
(45) Date of Patent: Jul. 26, 2022

(54) METHOD FOR QUALITATIVELY ANALYZING INSOLUBLE PIGMENT COMPOUND

(71) Applicant: LG Chem, Ltd., Seoul (KR)

(72) Inventors: Yeu Young Youn, Daejeon (KR); Sooyoung Kwak, Daejeon (KR); Young Hee Lim, Daejeon (KR); Hye Sung Cho, Daejeon (KR); Yeon Hwa Lee, Daejeon (KR)

(73) Assignee: LG Chem, Ltd.

( * ) Notice: Subject to any disclaimer, the term of this patent is extended or adjusted under 35 U.S.C. 154(b) by 341 days.

(21) Appl. No.: 16/778,600

(22) Filed: Jan. 31, 2020

(65) Prior Publication Data

US 2020/0166437 A1 May 28, 2020

Related U.S. Application Data

(63) Continuation of application No. PCT/KR2018/001328, filed on Jan. 31, 2018.

(30) Foreign Application Priority Data

Aug. 17, 2017 (KR) .......... 10-2017-0104324

(51) Int. Cl.
*G01N 30/72* (2006.01)
*G01N 1/28* (2006.01)
(Continued)

(52) U.S. Cl.
CPC .......... *G01N 1/28* (2013.01); *G01N 1/4055* (2013.01); *G01N 24/08* (2013.01); *G01N 30/7233* (2013.01); *G01N 2001/4094* (2013.01)

(58) Field of Classification Search
CPC .......... G01N 1/28; G01N 24/08; G01N 30/72; G01N 30/7233; G01N 24/107; G01N 1/4055
(Continued)

(56) References Cited

U.S. PATENT DOCUMENTS 4,879,011 A * 11/1989 Schram .............. B01D 15/3866  
                                                      204/157.42  
8,931,356 B2 * 1/2015 Michienzi ............ B01D 15/424  
                                                      73/61.52

(Continued)

FOREIGN PATENT DOCUMENTS

AU     2017236027 A1   10/2017  
CN     105854715 A     8/2016  
(Continued)

OTHER PUBLICATIONS

Chatel et al., Hydrophobic Bis(trifluoromethylsulfonyl)imide-Based Ionic Liquids Pyrolysis: Through the Window of the Ultrasonic Reactor, ACS Sustainable Chemistry & Engineering, Published Dec. 2012, pp. 137-143, American Chemical Society.

(Continued)

*Primary Examiner* — Peter J Macchiarolo  
*Assistant Examiner* — Mohammed E Keramet-Amircolai  
(74) *Attorney, Agent, or Firm* — Lerner, David, Littenberg, Krumholz & Mentlik, LLP (57) ABSTRACT

A method for analyzing the structure of an insoluble pigment compound is disclosed. In some embodiments, a method comprise determining a molecular weight of the pigment compound, the insoluble pigment compound by ultrasonic treatment in a solvent to form partial structural compounds, analyzing the elemental composition and the structure of partial structural compounds by liquid chromatography/mass spectrometry and nuclear magnetic resonance, respec- (Continued)

tively and determining the structure of the insoluble pigment compound from the analysis of the partial structural compounds and the molecular weight of the insoluble pigment compound. In some embodiments, a method comprises determining molecular weight of the pigment compound using matrix assisted laser desorption ionization-time of flight mass spectrometry, selecting a parent mass, fragmenting the parent mass and determining the molecular weight of each fragment, and determining the structure of the insoluble pigment compound from the molecular weight of the insoluble pigment compound and that of the fragments.

11 Claims, 10 Drawing Sheets

(51) Int. Cl.
    *G01N 24/08* (2006.01)
    *G01N 1/40* (2006.01)
(58) Field of Classification Search
    USPC .......................................................... 73/61.55
    See application file for complete search history.

(56) References Cited

U.S. PATENT DOCUMENTS

| | | | |
|---|---|---|---|
| 2002/0016999 A1 | 2/2002 | Keyzer | |
| 2002/0098518 A1* | 7/2002 | Levinson | C12Q 1/18 435/7.1 |
| 2006/0187974 A1* | 8/2006 | Dantus | H01J 49/164 372/9 |
| 2006/0213257 A1* | 9/2006 | Togashi | B01L 13/02 73/864.22 |
| 2006/0261267 A1* | 11/2006 | Sze | C08F 8/30 250/288 |
| 2009/0145333 A1* | 6/2009 | Lin | C09B 67/0002 106/486 |
| 2010/0018438 A1* | 1/2010 | Claes | C08F 2/50 106/31.77 |
| 2010/0193777 A1 | 8/2010 | Takahashi et al. | |
| 2011/0245347 A1* | 10/2011 | Choi | C07C 231/24 564/153 |
| 2012/0071615 A1* | 3/2012 | Lim | C07F 17/00 556/11 |
| 2012/0172498 A1 | 7/2012 | Fontana et al. | |
| 2012/0176603 A1* | 7/2012 | Jung | G01N 21/64 356/301 |
| 2013/0105684 A1* | 5/2013 | Louette | G01N 30/8665 250/282 |
| 2014/0047906 A1* | 2/2014 | Herman | G01N 33/6848 73/61.55 |
| 2014/0364548 A1* | 12/2014 | Everhardus | C09D 11/322 524/265 |
| 2014/0377290 A1* | 12/2014 | Kim | A61K 47/60 424/179.1 |
| 2015/0056223 A1* | 2/2015 | Lim | C07K 16/18 424/179.1 |
| 2015/0332906 A1 | 11/2015 | Bark et al. | |
| 2016/0020080 A1* | 1/2016 | Pyun | H01J 49/40 427/255.6 |
| 2016/0131618 A1* | 5/2016 | Koulman | G01N 30/7233 250/288 |
| 2016/0148793 A1 | 5/2016 | Kim et al. | |
| 2016/0195500 A1* | 7/2016 | Trapp | G01N 30/86 73/61.55 |
| 2017/0105928 A1 | 4/2017 | Jung et al. | |

FOREIGN PATENT DOCUMENTS

| | | |
|---|---|---|
| EP | 2876434 A1 | 5/2015 |
| JP | 2011053094 A | 3/2011 |
| JP | 2012181378 A | 9/2012 |
| KR | 20110112838 A | 10/2011 |
| KR | 20130086927 A | 8/2013 |
| KR | 20150117652 A | 10/2015 |
| KR | 101692314 B1 | 1/2017 |
| KR | 20170050559 A | 5/2017 |

OTHER PUBLICATIONS

International Search Report for Application No. PCT/KR2018/001328, dated May 11, 2018, pp. 1-4.

Lrimpin et al., Characterization of an Insoluble Poly(9,9-diphenyl-2,7-fluorene) by Solvent-Free Sample Prepara, Analytical Chemistry, Aug. 2002, pp. 3777-3782, vol. 74, No. 15, American Chemical Society.

Lee KW, Chung YS, Kim JP. Effects of ultrasound treatment and dye crystalline properties on particle size distribution. Textile Research Journal. Nov. 2001;71(11):976-80. XP05570732.

Extended European Search Report including Written Opinion for EP18846639.5 dated Jun. 30, 2020; 9 pages.

* cited by examiner

METHOD FOR QUALITATIVELY ANALYZING INSOLUBLE PIGMENT COMPOUND

CROSS-REFERENCE TO RELATED APPLICATION(S)

The present application is a continuation of International Application No. PCT/KR2018/001328, filed on Jan. 31, 2018, which claims the benefit of priority from Korean Patent Application No. 10-2017-0104324, filed on Aug. 17, 2017, the entire disclosures of which are incorporated by reference herein.

FIELD OF THE INVENTION

The present invention relates to a method for qualitative analysis of insoluble pigment compounds, and more particularly to a pretreatment method for qualitative analysis of insoluble pigment compounds.

BACKGROUND OF THE INVENTION

Pigments are used in photoresist for color filters (R, G, B) of a liquid crystal display (LCD) or in many industrial areas such as coloring paints, inks, plastics, textiles, cosmetics, etc. As pigments are used in various industrial fields, quantitative and qualitative analyses of pigments are required. Various analytical methods such as mass spectrometry (MS), nuclear magnetic resonance (NMR), energy dispersive x-ray spectroscopy (EDS), and X-ray fluorescence (XRF) can be used for qualitative analysis of unknown pigments. However, since pigments have low solubility in organic solvents and often contain metals, there are many restrictions on the selection of a method for determining their structures.

For the pigments with low solubility in organic solvents, it is difficult to determine their structures by using liquid chromatography/mass spectrometry (LC/MS) and NMR. For the pigments containing paramagnetic metals, it is difficult to determine their structure by using NMR.

In the currently used analysis methods of pigments, their molecular weights are determined with MALDI-TOF MS (matrix-assisted laser desorption ionization-time of flight mass spectrometry) or DART-MS (direct analysis in real time mass spectrometry) and their structures are determined with Py-GC/MS (pyrolysis-gas chromatography/mass spectrometry) and are predicted through investigations of related technical literatures. However, when it is not possible to predict structures of the pigments through investigations of literatures or to determine their structures with Py-GC/MS, the information only about their molecular weight is often obtained. Therefore, there is a need to develop pretreatment methods of pigments to analyze with LC/MS or NMR.

SUMMARY OF THE INVENTION

The object of the present invention is to provide a pretreatment method for analyzing a structure of an insoluble pigment compound.

In order to achieve the above object, there is provided a method for qualitative analysis of an insoluble pigment compound, comprising a pretreatment step by ultrasonic degradation of an insoluble pigment compound to improve the solubility of the compound or by fragmentation of a pigment molecule with a laser.

Specifically, the present invention provides, in one embodiment, a method for qualitative analysis of an insoluble pigment compound, comprising:

determining a molecular weight of the insoluble pigment compound in the solid state;

bringing the insoluble pigment compound into degradation by ultrasonic treatment in a solvent to form partial structural compounds in the solvent;

analyzing the elemental composition and the structure of the partial structural compounds by liquid chromatography/mass spectrometry (LC/MS) and nuclear magnetic resonance (NMR), respectively; and determining the structure of the insoluble pigment compound from the analysis of the partial structural compounds and the molecular weight of the insoluble pigment compound The present invention provides, in a second embodiment, a method for qualitative analysis of an insoluble pigment compound, comprising: determining a molecular weight of an insoluble pigment compound using matrix assisted laser desorption ionization-time of flight mass spectrometry (MALDI-TOF MS);

selecting a parent mass representing the insoluble pigment compound in a mass spectrum generated by the MALDI_TOF MS;

fragmenting the parent mass into fragments, each fragment having a smaller mass than the parent mass and determining the molecular weight of each fragment; and determining the structure of the insoluble pigment compound from the molecular weight of the insoluble pigment compound and the molecular weights of the fragments.

According to one embodiment, the ultrasonic treatment may be performed by applying ultrasonic waves of 40 kHz for 1 to 24 hours, for example 12 hours.

According to one embodiment, in case of using $N_2$ laser of Bruker Ultraflex, the laser irradiation is carried out with a laser intensity of 20% to accumulate 600 shots while maintaining a laser attenuator at 68% at 20 Hz.

According to one embodiment, the insoluble pigment compound may be a bis-oxodihydro-indolylene-benzodifuranone derivative.

According to one embodiment, the solvent may be tetrahydrofuran (THF), trichloromethane ($CHCl_3$) or the like.

Effect of the Invention

The present invention enables to predict the partial structures of an insoluble pigment compound with LC/MS and NMR by ultrasonic degradation of the compound or with detection of m/z by fragmentation of the compound.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the analyses of pigment structures by conventional techniques, there was a difficulty analysis of pigment structures by the application of LC/MS and the usage of NMR due to low solubility of pigments in organic solvents. Particularly, in case of pigments containing paramagnetic metals, it was very difficult to analyze them with NMR.

The currently used pigment analysis methods are to determine molecular weights of the pigments by using MALDI-TOF MS or DART-MS and to determine their structures by using Py-GC/MS. However, it is difficult to predict the structures if not detected in Py-GC/MS.

In order to solve the above problems, the present invention provides a method of analyzing a pigment structure with LC/MS or NMR, by developing a pretreatment method of an insoluble pigment.

The method for analyzing a structure of an insoluble pigment compound according to the present invention comprises a pretreatment step by ultrasonic degradation of an insoluble pigment compound to improve the solubility of the compound or by fragmentation of a pigment molecule with a laser.

More specifically, a method for qualitative analysis of an insoluble pigment compound according to the present invention comprises:

determining a molecular weight of the insoluble pigment compound in the solid state;

bringing the insoluble pigment compound into degradation by ultrasonic treatment in a solvent to form partial structural compounds in the solvent; and analyzing the elemental composition and the structure of the partial structural compounds by liquid chromatography/mass spectrometry (LC/MS) and nuclear magnetic resonance (NMR), respectively; and determining the structure of the insoluble pigment compound from the analysis of the partial structural compounds and the molecular weight of the insoluble pigment compound In another embodiment, a method for qualitative analysis of an insoluble pigment compound according to the present invention comprises: determining a molecular weight of an insoluble pigment compound using matrix assisted laser desorption ionization-time of flight mass spectrometry (MALDI-TOF MS);

selecting a parent mass representing the insoluble pigment compound in a mass spectrum generated by the MALDI-TOF MS;

fragmenting the parent mass into fragments, each fragment having a smaller mass than the parent mass and determining the molecular weight of each fragment; and determining the structure of the insoluble pigment compound from the molecular weight of the insoluble pigment compound and the molecular weights of the fragments.

According to one embodiment, the ultrasonic treatment may be performed by applying ultrasonic waves of 40 kHz for 12 hours using Branson 5810 model, but it may be appropriately adjusted according to the characteristics and structure of the pigment.

According to one embodiment, in case of using a Bruker UltrafleXetreme, selective laser irradiation of the compound corresponding to the parent mass peak is carried out, by setting the Smartbeam laser parameter to 3_medium and irradiating with a laser intensity of 50% at 1000 Hz to accumulate 2500 shots.

That is, it is possible to predict the partial structures of the pigment molecule by the degradation of the pigment molecule under ultrasonic waves or by fragmenting the pigment molecule using a laser to analyze the structures of the cleaved pigment molecule in various methods. The structure of the original pigment molecule can be predicted through the prediction of the partial structures.

According to one embodiment, the insoluble pigment compound may be diketopoyrrolopyrrole-based derivatives.

According to one embodiment, the solvent may be THF, $CHCl_3$, etc.

The MALDI-TOF MS is a method in which a low molecular weight (100 to 300 Da) organic or inorganic matrix and a cationic medium are mixed to form uniform crystals in order to desorb polymer substances that are easily degraded even by a small energy, and then a strong pulse $N_2$ laser of ~337 nm is irradiated to the crystals to accomplish precise mass analyses by TOF-MS. The method enables to measure molecular weights of the polymer substances having a molecular weight of 300 Da or more, to analyze the samples at femtomolar level due to high sensitivity of the method, and to significantly reduce cleavage of the compounds to be analyzed at the time of ionization. Thus, it may be more suitable to analyze the original pigment molecules without cleavage.

For selective laser irradiation on the compound corresponding to the parent mass peak, the resolution of the peaks may typically be in the range of ±2 Da to ±8 Da.

Hereinafter, embodiments of the present invention will be described in detail so that those skilled in the art can easily carry out the present invention.

The present invention may, however, be embodied in many different forms and should not be construed as limited to the embodiments set forth herein.

Example 1: Analysis of Structure of Pigment Using Ultrasonic Treatment

1. Pigment sample: Powder B582 (WO 2010/081756), a black pigment manufactured by BASF.
2. Analysis method
2.1 Equipment: LTQ Orbitrap Elite MS and MALDI-TOF MS
2.2. LC/MS conditions
Organic solvent: THF
Ionization: APCI positive
HPLC conditions
Column: Capcellpak C18 (4.6 mm ID×50 mm L×3 μm)

| Time (min) | A (%) | B (%) |
| --- | --- | --- |
| 0 | 30 | 70 |
| 5 | 30 | 70 |
| 10 | 100 | 0 |
| 20 | 100 | 0 |

A: ACN/TFA 100/0.1
B: H$_2$O/TFA 100/0.01

Figure 1:
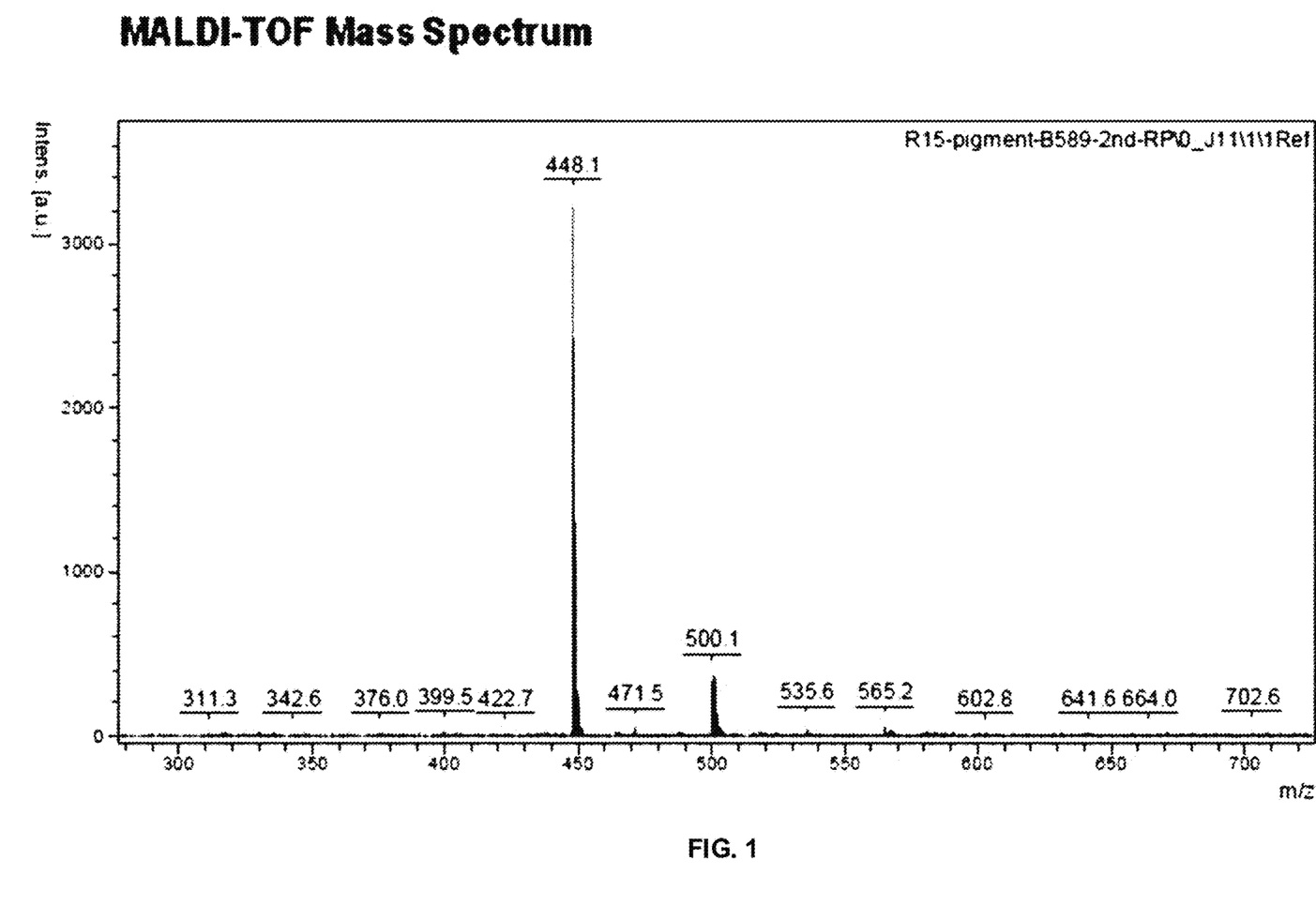
FIG. 1 shows a molecular weight of a solid state B582 (BASF black pigment) sample obtained by MALDI-TOF MS.

Flow rate: 1 mL/min
Column temperature: 40° C.
2.3 MALDI-TOF MS conditions
1 mg of a B582 sample and 9 mg of a matrix (DCTB) were ground together in a mortar and then applied to a plate in a solid state to prepare an analytical sample (solvent free method).
Method: RP_12 kDa (Reflector, positive)
3. Analysis results
A molecular weight was obtained by analyzing the B582 sample in a solid state with MALDI-TOF MS, and the results are shown in FIG. 1. As a result of the MALDI-TOF MS measurement, a single substance having a molecular weight of 448 was detected. As a result of analyzing the component dissolved in THF by LC/MS, a substance having a molecular weight of 319 was detected. The substance having a molecular weight of 319 is presumed to be a compound broken out from the black pigment sample. The predicted structures of the substance having a molecular weight of 448 and the substance having a molecular weight of 319 are as follows:

<Predicted Structure of Pigment>

Chemical Formula: C$_{26}$H$_{12}$N$_2$O$_6$
Exact Mass: 448.07

<Structure which was Further Detected from the Sample Dissolved in the Organic Solvent>

Chemical Formula: C$_{18}$H$_9$NO$_5$
Exact Mass: 319.05

The B582 sample was dissolved in THF at a concentration of 5 mg/mL and a solution of the sample was sonicated.

Figure 2:
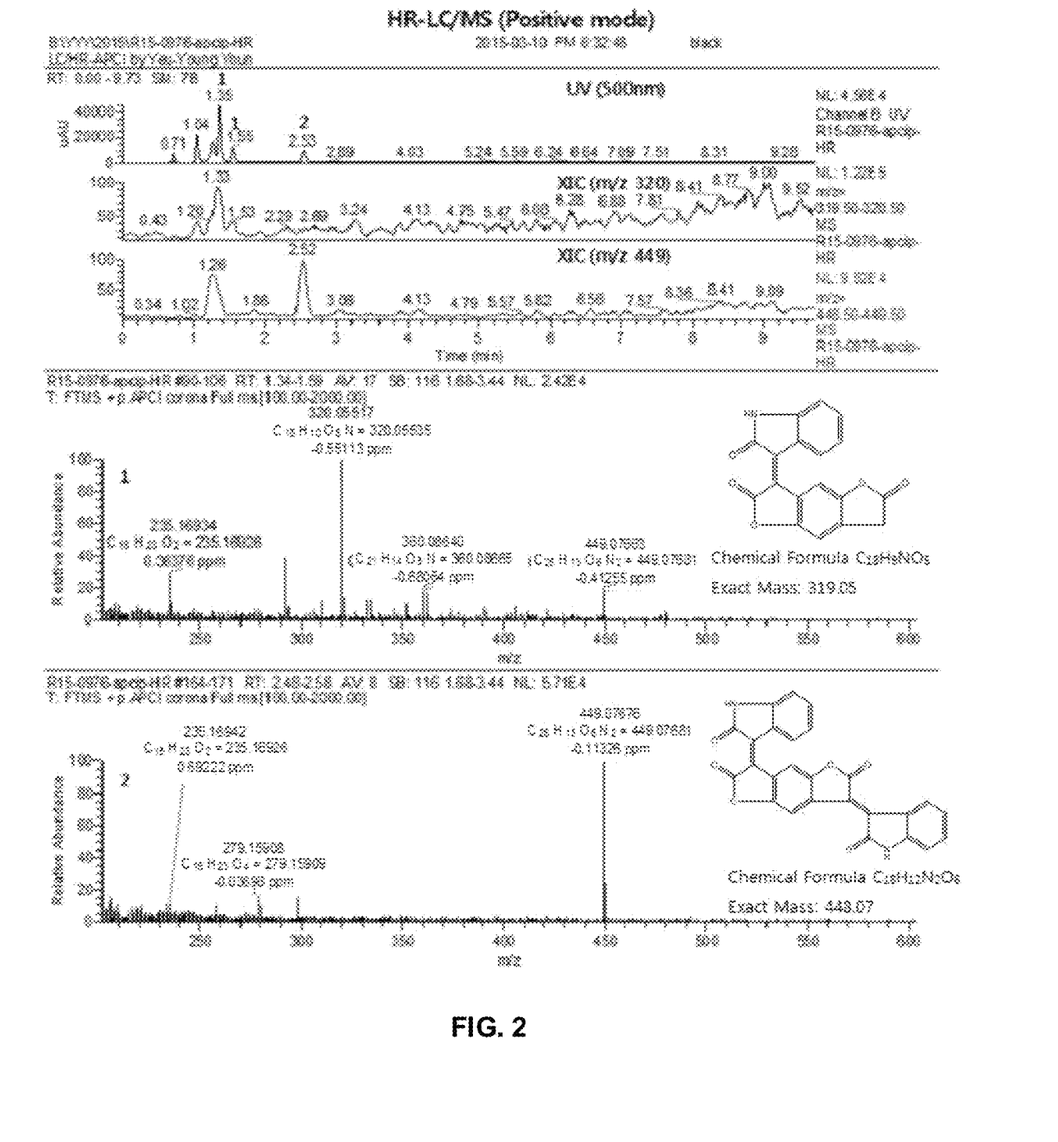
FIG. 2 shows a result of HR LC/MS analysis of B582 dissolved in THF.
Figure 3:
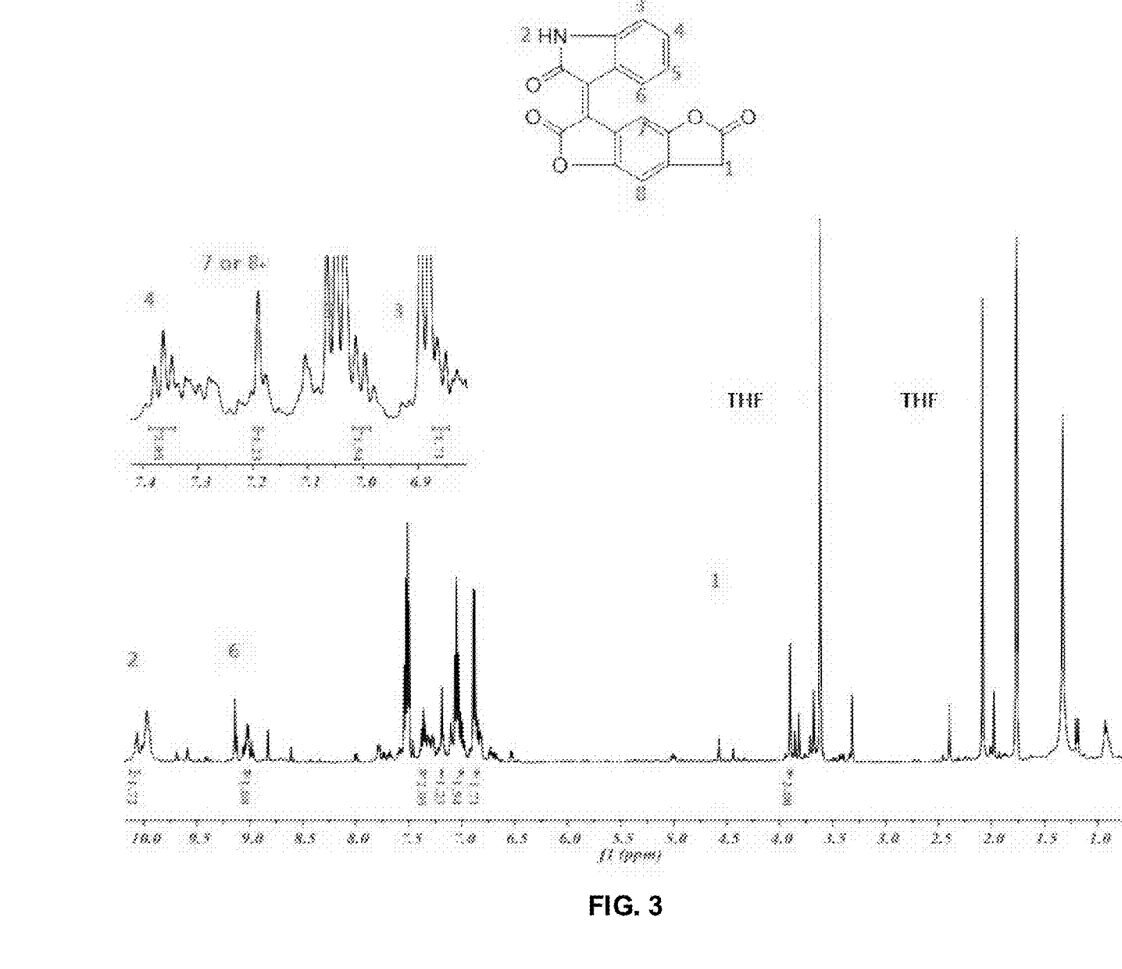
FIG. 3 shows a result of $^1H$ NMR analysis of B582 dissolved in THF.
Figure 4:
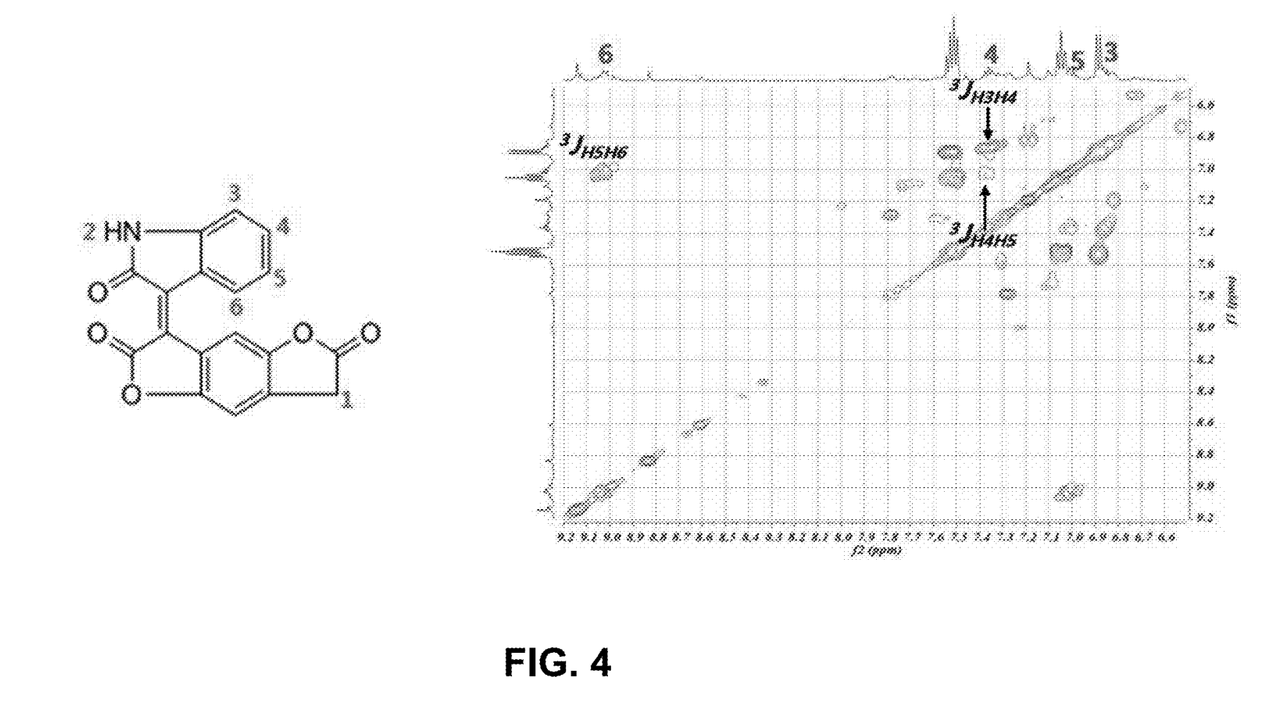
FIG. 4 shows a result of gCOSY NMR analysis of B582 dissolved in THF.
Figure 5:
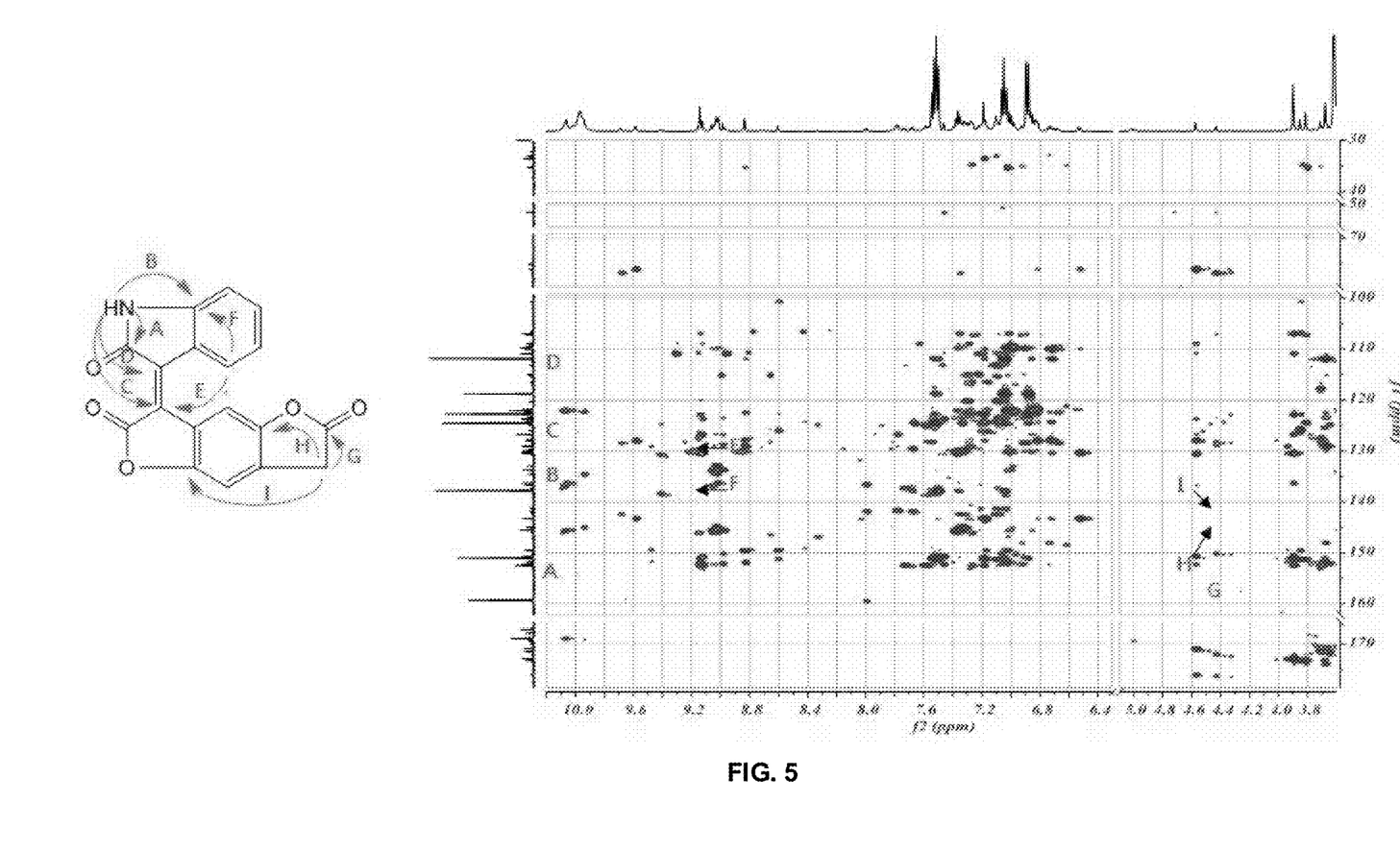
FIG. 5 shows a result of gHMBC NMR analysis of B582 dissolved in THF.
Figure 6:
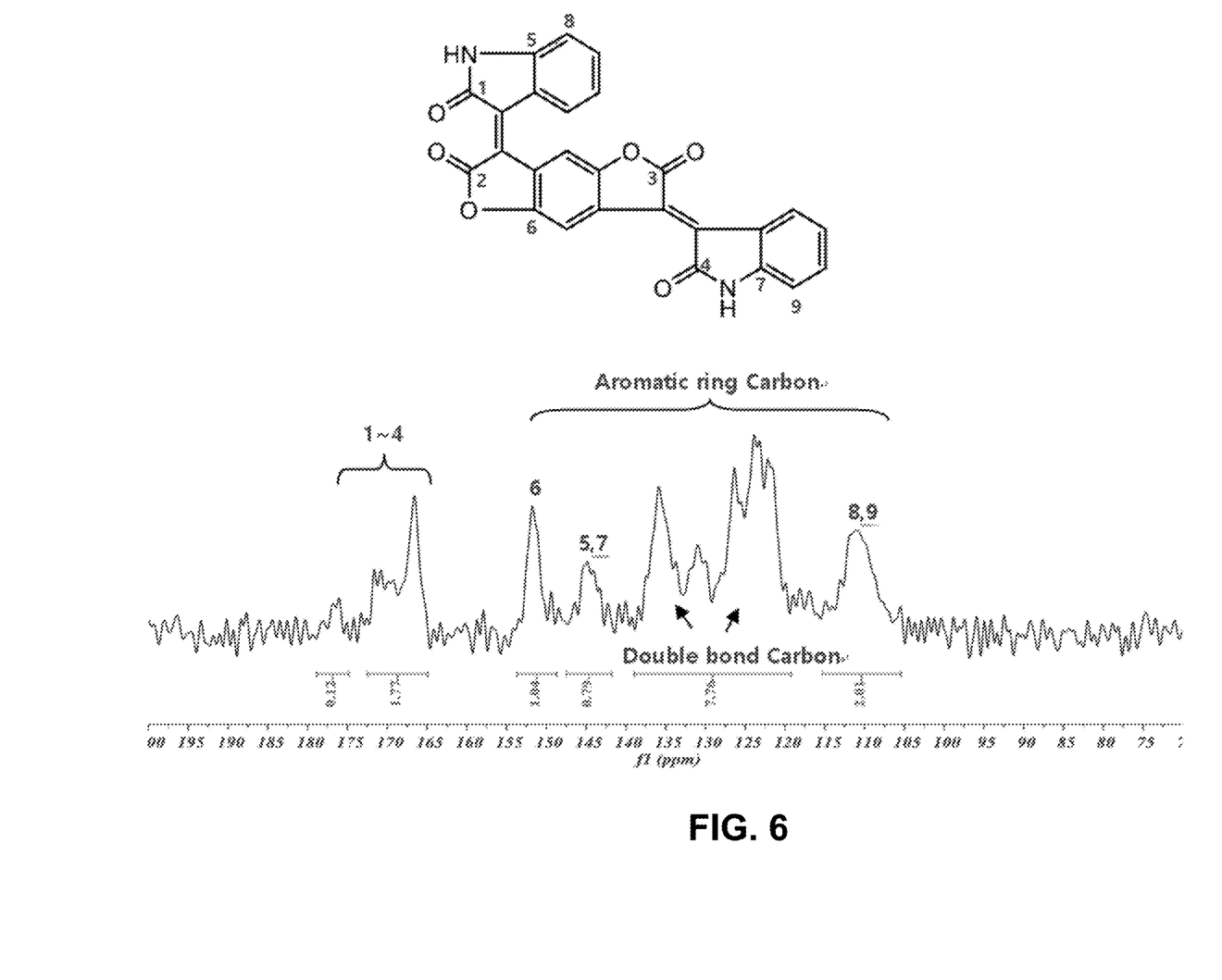
FIG. 6 shows $^{13}C$ MAS SSNMR spectrum of B582 in a solid state.

Sonication Condition
By using a Branson 5810 model, an ultrasonic wave of 40 kHz was applied to the 8582 sample at room temperature for 12 hours.
The results of analysis of the elemental composition of the 8582 sample slightly dissolved in THF are shown in FIG. 2 (HR LC/MS), FIG. 3 ($^1$H NMR), FIG. 4 (gCOSY NMR) and FIG. 5 (gHMBC NMR).
From analysis results of the solution sample by HR LC/MS (FIG. 2) and NMR (FIG. 3, FIG. 4 and FIG. 5), the structure predicted from the MS analysis could be supported and the component dissolved in THF was presumed to have the structure of the substance having a molecular weight of 319 which was determined by MS analysis. The substance having a molecular weight of 319 does not correspond to a main structure. There were structures other than the above structure, but their exact structures were not identified.
FIG. 6 shows $^{13}$C MAS SSNMR spectrum of the pigment itself (solid state). As a result of the measurement by $^{13}$C MAS SSNMR, it was found that there were no aliphatic structures other than the structure predicted by MS analysis, and there were aromatic rings, double bonds and carbonyl carbon.

Example 2: Analysis of Structure of Pigment by Using a Laser

1. Pigment sample
Red 264 (3,6-di([1,1'-biphenyl]-4-yl)-2,5-dihydropyrrolo[3,4-c]pyrrole-1,4-dione], which is mainly used as a pigment for mobile phone exterior materials, have a structure as follows:

<Representative Structure of Pigment Red 264>

Chemical Formula: C$_{30}$H$_{20}$N$_2$O$_2$
Exact Mass: 440.15

In this example, the structure of Red 264 was analyzed by using MALDI-TOF/TOF MS (Bruker, UltrafleXtreme).
2. Preparation of analytical samples
2 mg of Red 264 sample was placed on a MALDI target plate with a spatula.
N$_2$ gas was flowed over the sample placed on the target plate to remove the solid lump.

3. Analysis condition
3.1 Analysis condition of MALDI-TOF/TOF MS
3.1.1 As for FlexControl method, Litf.ltf was used.
Conditions of MS and LIFT
Reflectron Positive Mode
Ion Source 1: 7.50 kV
Ion Source 2: 6.75 kV
Lens: 3.50 kV
Reflector 1: 29.50 kV
Reflector 2: 14.00 kV
Pulsed Ion extraction: 80 ns
LIFT 1: 19.00 kV
LIFT 2: 3.40 kV
Conditions of laser and parent mass
Laser intensity: Laser 50% (1000 Hz), 2500 shots
Smartbeam parameter set: 3_medium
CID OFF mode
Parent mass: m/z 441

4. Analysis operation

The sample was analyzed according to the procedure of SOP [SOP-0494-0k (Standard operating procedure of Bruker MALDI-TOF/TOF(UltrafleXtreme)) and SOP-0496-0k (MS/MS standard operating procedure employing Bruker MALDI-TOF/TOF(UltrafleXtreme))] operating the instrument under the above analysis conditions.

Figure 7:
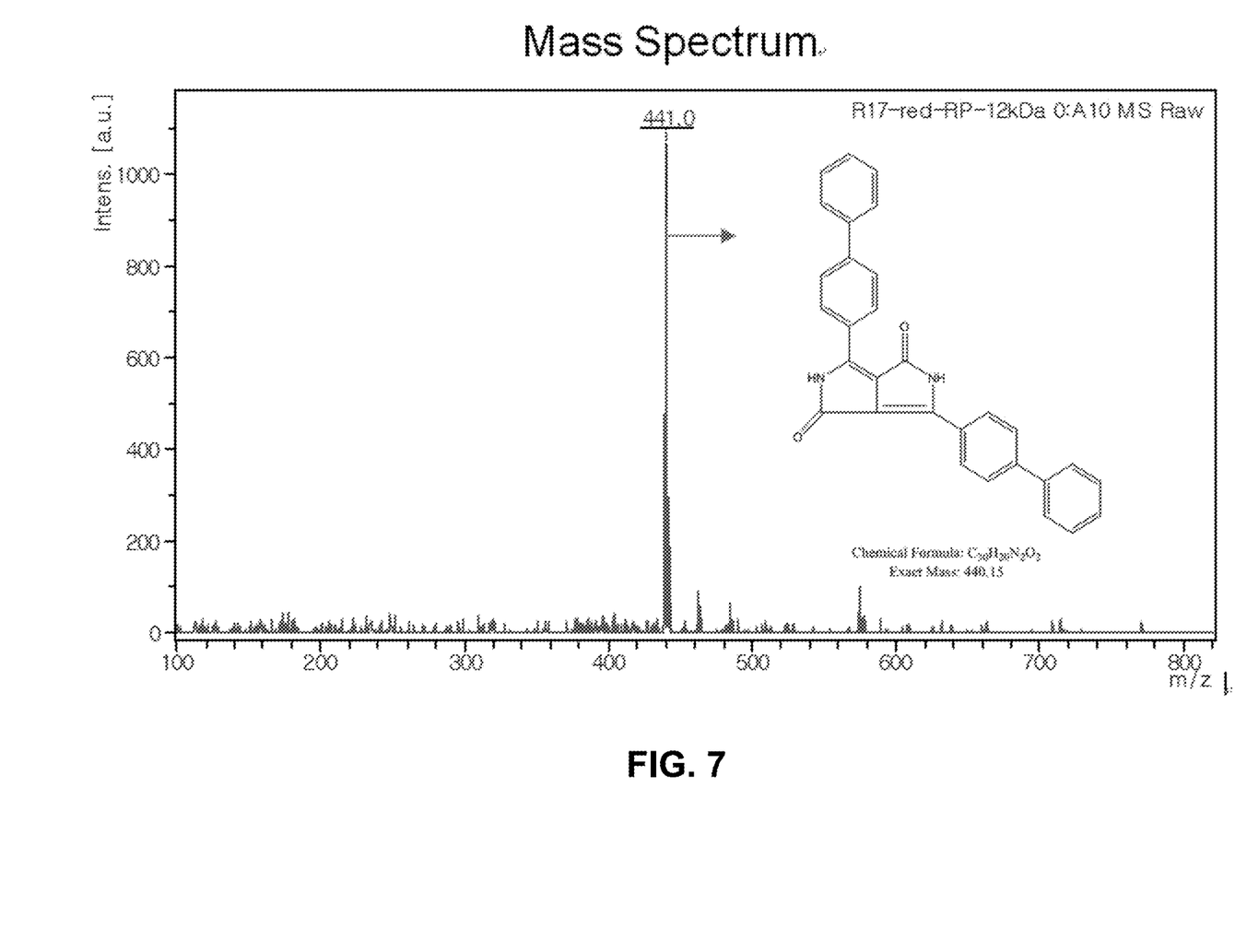
FIG. 7 shows a parent mass peak selected in the MALDI-TOF MS of pigment Red 264.

FIG. 7 shows the analysis result of a parent mass peak by the MALDI-TOF MS of pigment Red 264. The parent mass peak was obtained at m/z 441.

Figure 8:
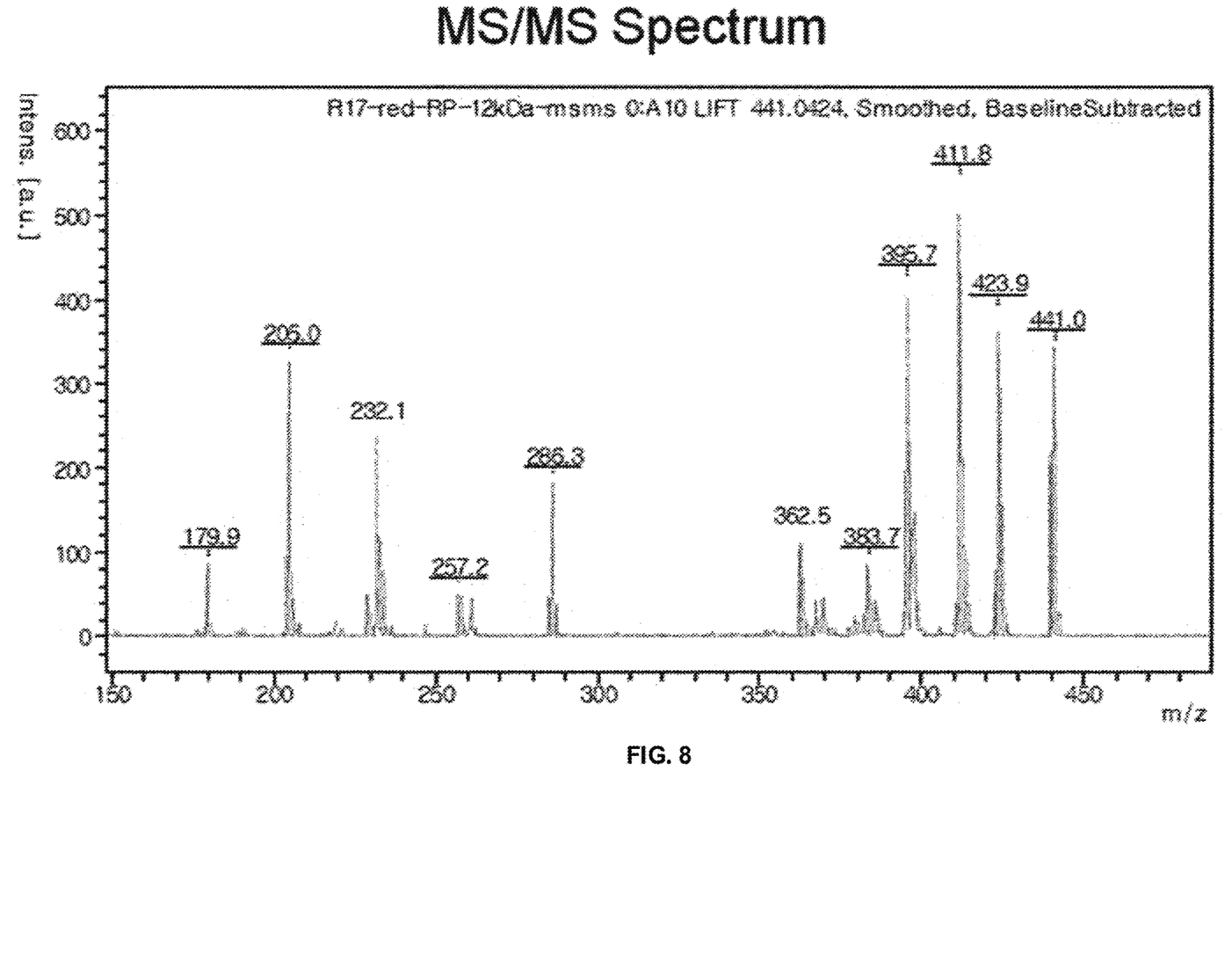
FIG. 8 shows MALDI-TOF/TOF MS/MS spectrum of pigment Red 264.
Figure 9A:
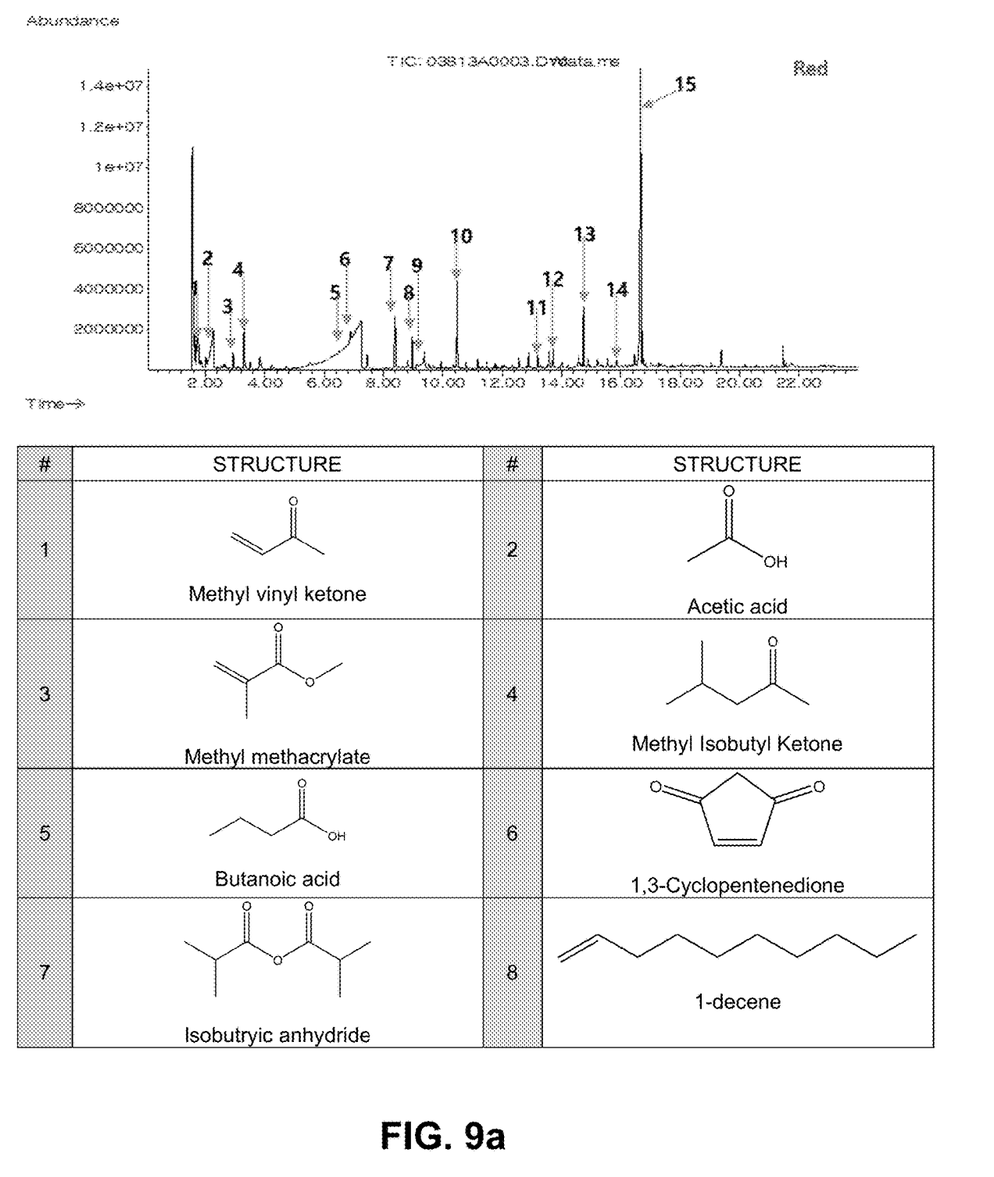
FIGS. 9a and 9b show the structures by Py-GC/MS of pigment Red 264.
Figure 9B:
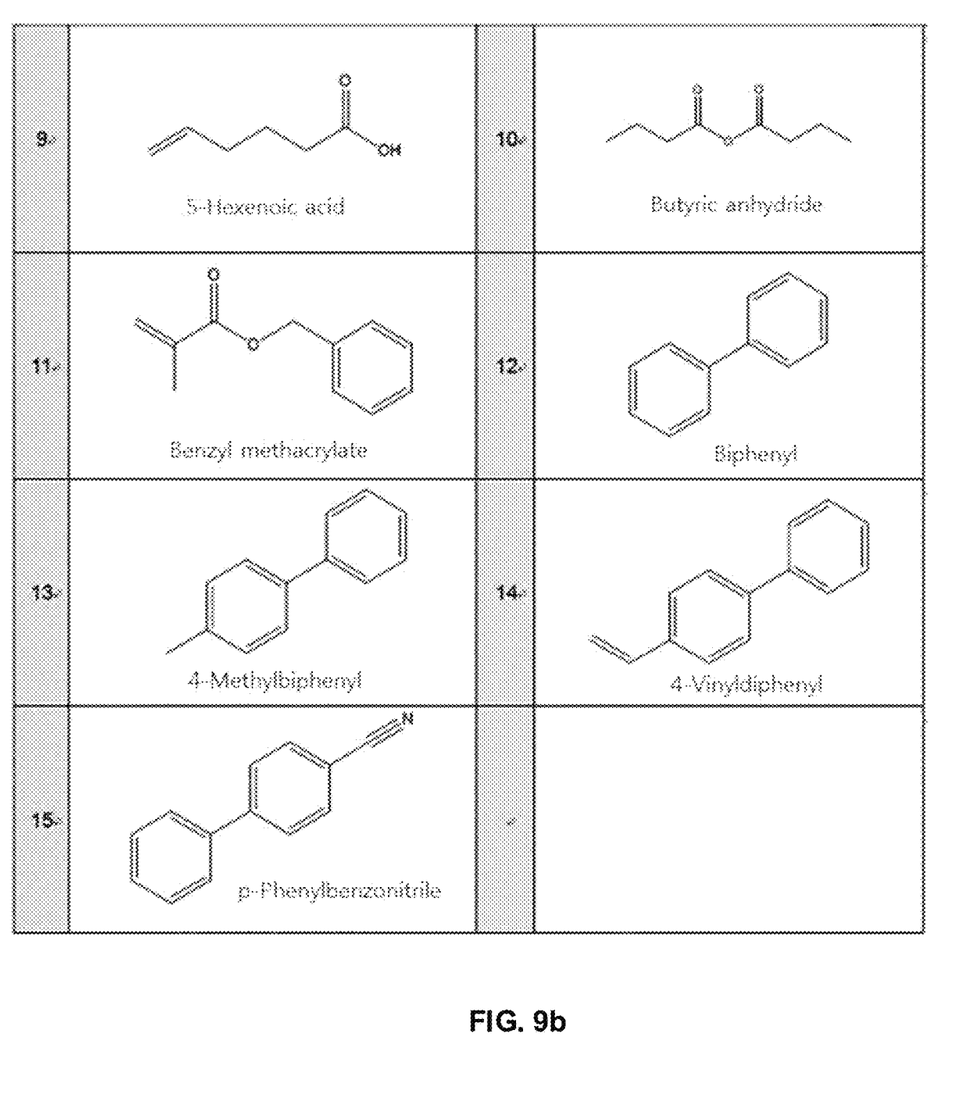

FIG. 8 shows MALDI-TOF/TOF MS/MS spectrum of pigment Red 264. From the MS/MS spectrum, it is found that peaks are present at m/z 424, 412, 286, 232, 205 and 180. The peaks at m/z 424, 412, 286, 232, 205, and 180 can be expected to represent peaks for the following fragments, respectively.

[The Structures Fragmented by Laser]

| Sample | Ingredient | Remark |
| --- | --- | --- |
| Red 264 | Methyl methacrylate, benzyl methacrylate<br>Acetic acid, butanoic acid, 5-hexenoic acid<br>Biphenyl, 4-methyl biphenyl, 4-vinyldiphenyl,<br>p-phenylbenzonitrile | Dispersant for binder and<br>binder monomer<br>Expected to be the material<br>derived from pigments |

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method for qualitative analysis of an insoluble pigment compound, comprising:
   determining a molecular weight of the insoluble pigment compound in the solid state;
   bringing the insoluble pigment compound into degradation by ultrasonic treatment in a solvent to form partial structural compounds in the solvent;
   analyzing the elemental composition and the structure of the partial structural compounds by liquid chromatography/mass spectrometry (LC/MS) and nuclear magnetic resonance (NMR), respectively; and
   determining the structure of the insoluble pigment compound from the analysis of the partial structural compounds and the molecular weight of the insoluble pigment compound.

2. The method for qualitative analysis of an insoluble pigment compound according to claim 1, wherein the insoluble pigment compound is bis-oxodihydro-indolylene-benzodifuranone-based derivatives or diketopoyrrolopyrrole-based derivatives.

3. The method for qualitative analysis of an insoluble pigment compound according to claim 1, wherein the solvent is tetrahydrofuran (THF) or trichloromethane ($CHCl_3$).

4. The method for qualitative analysis of an insoluble pigment compound according to claim 1, wherein the ultrasonic treatment further comprises:
   applying ultrasonic waves of 40 kHz for 1 to 24 hours for degradation of the insoluble pigment compound in the solvent.

5. The method for qualitative analysis of an insoluble pigment compound according to claim 1, wherein the molecular weight of the insoluble pigment compound is determined by mass spectrometry (MS).

6. The method for qualitative analysis of an insoluble pigment compound according to claim 5, wherein the MS is matrix assisted laser desorption ionization-time of flight mass spectrometry (MALDI-TOF MS).

7. The method for qualitative analysis of an insoluble pigment compound according to claim 1, wherein the insoluble pigment compound is bis-oxodihydro-indolylene-benzodifuranone-based derivatives or diketopoyrrolopyrrole-based derivatives.

8. A method for qualitative analysis of an insoluble pigment compound, comprising:
   determining a molecular weight of an insoluble pigment compound using matrix assisted laser desorption ionization-time of flight mass spectrometry (MALDI-TOF MS);
   selecting a parent mass representing the insoluble pigment compound in a mass spectrum generated by the MALDI_TOF MS;
   fragmenting the parent mass into fragments, each fragment having a smaller mass than the parent mass and determining the molecular weight of each fragment; and
   determining the structure of the insoluble pigment compound from the molecular weight of the insoluble pigment compound and the molecular weights of the fragments.

9. The method for qualitative analysis of an insoluble pigment compound according to claim 8, wherein the parent mass is fragmented using a laser.

10. The method for qualitative analysis of an insoluble pigment compound according to claim 9, wherein the laser is an $N_2$ laser.

11. The method for qualitative analysis of an insoluble pigment compound according to claim 10, wherein the parent mass is irradiated by 600 shots of the laser using a laser intensity of 20% and maintaining a laser attenuator at 68% at 20 Hz,
   the parent mass is irradiated by 2500 shots of the laser by setting the Smartbeam laser parameter to 3 medium and using a laser intensity of 50% at 1000 Hz.

* * * * *